US010178747B1

(12) United States Patent
Rivera et al.

(10) Patent No.: US 10,178,747 B1
(45) Date of Patent: Jan. 8, 2019

(54) SYSTEM FOR LANDSCAPE LIGHTING CUSTOMIZATION AND COMMUNICATION

(71) Applicant: Chien Luen Industries Co., Ltd., Inc., Oakland Park, FL (US)

(72) Inventors: Eliezer Rivera, Plantation, FL (US); Ronald R. Portorreal, Sunrise, FL (US); Zachary Zauhar, Oakland Park, FL (US); Charles E. Bucher, Tampa, FL (US); Tien S. Lowe, Cooper City, FL (US)

(73) Assignee: Chien Luen Industries Co., Ltd., Inc., Oakland Park, FL (US)

( * ) Notice: Subject to any disclaimer, the term of this patent is extended or adjusted under 35 U.S.C. 154(b) by 0 days.

(21) Appl. No.: 15/873,113

(22) Filed: Jan. 17, 2018

Related U.S. Application Data

(60) Provisional application No. 62/447,659, filed on Jan. 18, 2017.

(51) Int. Cl.
| | |
|---|---|
| *H05B 41/36* | (2006.01) |
| *H05B 39/04* | (2006.01) |
| *H05B 37/02* | (2006.01) |
| *F21S 10/02* | (2006.01) |
| *H05B 33/08* | (2006.01) |

(Continued)

(52) U.S. Cl.
CPC ............ *H05B 37/029* (2013.01); *F21S 10/02* (2013.01); *H05B 33/0863* (2013.01); *H05B 37/0281* (2013.01); *F21W 2131/109* (2013.01); *F21Y 2113/10* (2016.08)

(58) Field of Classification Search
CPC ............ H05B 33/0815; H05B 41/3927; H05B 41/28; H05B 41/3921; H05B 41/2828; H05B 41/2855; H05B 41/386; H05B 41/2882; H05B 41/2928; H05B 41/2806; H05B 41/2827; H05B 41/042; H05B 41/2822; H05B 41/282; H05B 41/295;

(Continued)

(56) References Cited

U.S. PATENT DOCUMENTS

| | | |
|---|---|---|
| 3,194,952 A | 7/1965 | Wells |
| 3,777,138 A | 12/1973 | Metzler |

(Continued)

OTHER PUBLICATIONS

Band I, Wikipedia, Aug. 15, 2012, retrieved from https://en.wikipedia.org/wiki/band_I, 3 pages.

(Continued)

*Primary Examiner* — Minh D A
(74) *Attorney, Agent, or Firm* — Brian S. Steinberger; Law Offices of Brian S. Steinberger, P.A.

(57) ABSTRACT

Systems, devices and methods for providing a controller to be wired between a transformer and zones of landscape lights to provide power to and for turning on and off different landscape lights, creating and deleting landscape light zones based on a schedule loaded onto the controller by a wireless communication from a portable digital device, such as a smart phone having a landscape scheduling App thereon. Additional embodiments include wireless receivers in the landscape lights which allow for the portable digital device to remotely change colors of the landscape lights. Additional embodiments for controlling other accessories used in landscapes such as but not limited to sprinkler systems, speakers, and the like.

16 Claims, 10 Drawing Sheets

(51) Int. Cl.
*F21Y 113/10* (2016.01)
*F21W 131/109* (2006.01)

(58) Field of Classification Search
CPC .. Y02B 20/202; Y02B 20/204; Y02B 20/208; H01J 65/046; H01J 61/827; H01F 38/10
See application file for complete search history.

(56) References Cited

U.S. PATENT DOCUMENTS

| | | | |
|---|---|---|---|
| 5,226,721 A | 7/1993 | Stokes | |
| 6,249,091 B1 | 6/2001 | Belliveau | |
| 6,331,756 B1 | 12/2001 | Belliveau | |
| 6,357,892 B1 | 3/2002 | Beadle | |
| 6,483,470 B1 | 11/2002 | Hohnstein et al. | |
| 6,580,361 B2 | 6/2003 | Bucher | |
| 6,782,309 B2 | 8/2004 | Laflamme et al. | |
| 6,784,357 B1 | 8/2004 | Wang | |
| 6,874,905 B1 | 4/2005 | Beadle | |
| 6,984,944 B2 | 1/2006 | Garrity | |
| 7,021,787 B1 | 4/2006 | Kuelbs | |
| 7,083,315 B2 | 8/2006 | Hansler | |
| 7,172,307 B2 | 2/2007 | Izardel | |
| 7,192,155 B2 | 3/2007 | Morrow et al. | |
| 7,204,608 B2 | 4/2007 | Beeman et al. | |
| 7,309,965 B2 | 12/2007 | Dowling et al. | |
| 7,387,409 B1 | 6/2008 | Beadle | |
| D574,532 S | 8/2008 | Lee et al. | |
| 7,502,034 B2 | 3/2009 | Chemel et al. | |
| 7,630,776 B2 | 12/2009 | Harwood | |
| 7,659,674 B2 | 2/2010 | Mueller et al. | |
| 7,817,063 B2 | 10/2010 | Hawkins et al. | |
| 7,841,734 B2 | 11/2010 | Wilcox | |
| 8,002,428 B2 | 8/2011 | Boyer et al. | |
| 8,010,319 B2 | 8/2011 | Walters et al. | |
| 8,042,961 B2 | 10/2011 | Massara et al. | |
| 8,090,453 B1 | 1/2012 | Harwood | |
| D654,611 S | 2/2012 | Chen | |
| D663,457 S | 7/2012 | Ho et al. | |
| 8,382,347 B2 | 2/2013 | McCanless | |
| 8,534,867 B1 | 9/2013 | Beadle | |
| 8,602,585 B1 | 12/2013 | Lowe et al. | |
| 8,632,234 B1 | 1/2014 | Lowe et al. | |
| 8,818,530 B2 | 8/2014 | Netzel, Sr. et al. | |
| 9,004,706 B1 | 4/2015 | Banfield | |
| 9,668,053 B1 | 5/2017 | Rivera et al. | |
| 2003/0127990 A1 | 7/2003 | Weng | |
| 2004/0130909 A1 | 7/2004 | Mueller et al. | |
| 2005/0002183 A1 | 1/2005 | Wardzala | |
| 2005/0024857 A1 | 2/2005 | Vishwamitra | |
| 2005/0253533 A1 | 11/2005 | Lys et al. | |
| 2006/0039570 A1 | 2/2006 | Yeh | |
| 2006/0126860 A1 | 6/2006 | Sievers et al. | |
| 2006/0154598 A1 | 7/2006 | Rudland et al. | |
| 2006/0203471 A1 | 9/2006 | Hodges et al. | |
| 2007/0223723 A1 | 9/2007 | Haase | |
| 2008/0074867 A1 | 3/2008 | Chen | |
| 2009/0195063 A1* | 8/2009 | Joseph | H02J 13/0058 307/1 |
| 2009/0196016 A1 | 8/2009 | Massara et al. | |
| 2009/0207607 A1 | 8/2009 | Haase et al. | |
| 2010/0084985 A1 | 4/2010 | Woytowitz | |
| 2010/0215201 A1 | 8/2010 | Kalomirakis et al. | |
| 2011/0074266 A1 | 3/2011 | Sun | |
| 2011/0175553 A1* | 7/2011 | Sampsell | H05B 37/0245 315/312 |
| 2012/0320572 A1 | 12/2012 | Fischer et al. | |
| 2015/0102731 A1 | 4/2015 | Altamura et al. | |
| 2015/0237700 A1* | 8/2015 | Woytowitz | H05B 33/0863 315/307 |
| 2015/0334811 A1* | 11/2015 | So | H05B 37/0272 315/152 |

OTHER PUBLICATIONS

FM Broadcasting in Japan, Wikipedia Aug. 15, 2012, retrieved from https://en.wikipedia.org/wiki/FM_broadcasting_in_Japan, 1 page.
America Starpower X2 Wireless Microphone System Operation Instructions, NADY Systems, Sep. 14, 2004, 4 pages.

* cited by examiner

FIG. 3
Zone Controller

FIG. 4

All Zones On/Off

|  |  |  | Manual Set |  |
|---|---|---|---|---|
|  | Zone 1 | off |  | on |
|  | Zone 2  | off | ● | on |
| ✓ | Zone 3 🗓 | off | ● | on |
|  | Zone 4 | off | ● | on |

Auto Sunset/Sunrise

Schedule

FIG. 5A

Zone 1: Front Yard
Zone 2: Back Yard

FIG. 5B

Sunset: 7:34pm
Sunrise: 6:45am

Sunrise Auto off      off  on

Delay Auto OFF    1 hr   2 hr   3 hr   4 hr   5 hr   6 hr
                     ○     ○     ●     ○     ○     ○

Manual Timer OFF

FIG. 5C

Sunset: 7:34pm
Sunrise: 6:45am

Sunset Auto ON                    off ● on

Manual Timer ON

SYSTEM FOR LANDSCAPE LIGHTING CUSTOMIZATION AND COMMUNICATION

CROSS REFERENCE TO RELATED APPLICATION

This application claims the benefit of priority to U.S. Provisional Application Ser. No. 62/447,659 filed Jan. 18, 2017, the entire disclosure of which is incorporated herein by specific reference thereto.

FIELD OF INVENTION

This invention relates to landscape lighting, and in particular to systems, devices and methods for providing a controller to be wired between a transformer and zones of landscape lights to provide power to and for turning on and off different landscape lights, creating and deleting landscape light zones based on a schedule loaded onto the controller by a wireless communication from a portable digital device, such as a smart phone having a landscape scheduling App thereon, and another embodiment for providing landscape lights each with individual wireless receivers or power-line communication receivers so the portable digital device remotely changes colors of the landscape lights, and additional embodiments for controlling other accessories used in landscapes such as but not limited to sprinkler systems, speakers, and the like.

BACKGROUND AND PRIOR ART

Landscape lights are popular for lighting up residential and commercial pathways, driveways, yards, and the like. Typically, individual low voltage landscape lights are hard wired directly to a transformer which in turn is hardwired to a power source. Once installed the lights are generally controlled by the transformer having a photocell that turns the lights on at dusk and off after a user selectable amount of time or at dawn.

The prior art generally allows for only controlling one string of lights at a time, and not control multiple zones, where each zone can have a string of lights. The prior art generally does not allow for controlling individual lights or accessories connected to a string of lights. Accessories can include but are not limited to speakers, motion detectors, sprinklers, water fall pumps, and the like.

In the prior art, the user must run the powered cable from a 120 volt power supply to a transformer, which then is directly wired to a line of landscape lights. Here, a single switch is often used to power all lighting down the line. As such, there are problems with these prior art setups.

The single switch control is undesirable for the customer because the landscape lighting power source would need to be powered on at all times consuming energy and affecting the lifetime use of the power source.

Additionally, the operator would have to cut the landscape lighting cable for each light and then make two wiring connections in order for the switch to operate correctly.

Additionally, each zone of a string of landscape lights would also require separate switches to turn on and off the selected zone of landscape lights. As such, the more zones of the landscape lights, the more manual time is needed to operate and control the zones.

Thus, the need exists for solutions to the above problems with the prior art.

SUMMARY OF THE INVENTION

A primary objective of the present invention is to provide systems, devices and methods for providing a controller to be wired between a transformer and multiple zones of landscape lights to provide power to and for turning on and off different landscape lights, creating and deleting landscape light zones based on a schedule loaded onto the controller by a wireless communication from a portable digital device, such as a smart phone having a landscape scheduling App.

A secondary objective of the present invention is to provide systems, devices and methods for providing a controller to be wired between a transformer and multiple zones of landscape lights to provide power to and for turning on and off different landscape lights, creating and deleting landscape light zones based on a schedule loaded onto the controller by a wireless communication from a portable digital device, and for providing the landscape lights each with individual wireless receivers (or power-line communication receivers) so the portable digital device remotely changes colors of the landscape lights.

A third objective of the present invention is to provide systems, devices and methods for providing a controller to be wired between a transformer and landscape accessories, such as but not limited to speakers, sprinklers, and the like, for controlling those accessories, wherein a schedule in the controller is loaded from a wireless communication (or power-line communication receivers) from portable digital devices, such as but not limited to sprinkler systems, speakers, and the like.

A fourth objective of the present invention is to provide systems, devices and methods for providing a controller to be wired between a transformer and multiple zones of landscape lights. for universal or individual zone programming.

A fifth objective of the present invention is to provide systems, devices and methods for providing a controller to be wired between a transformer and multiple zones of landscape lights for universal or individual On/Off function capability.

A sixth objective of the present invention is to provide systems, devices and methods for providing a controller to be wired between a transformer and multiple zones of landscape lights for universal or individual timer function capability.

A communication system for controlling landscape lights, can include a transformer connected to a power source, a plurality of landscape lights mounted at different locations being powered through the transformer, and a controller wired between the transformer and the plurality of landscape lights, the controller for providing power to and for controlling operation of each of the landscape lights, the controller having a wireless receiver for receiving a schedule transmitted from a remote digital device.

The power source can include 120 volt power supply, and the transformer converts the 120 volt power supply to a 12 volt power.

The schedule can provide times for turning on and off the landscape lights.

The plurality of landscape lights can include a plurality of zones of landscape lights. Each zone can be separately hardwired to the controller.

The schedule can further provide scheduling times for adding a new zone having at least one landscape light to the plurality of zones and for deleting at least one of the plurality of zones.

The controller can include a wireless receiver antenna and a computer for storing the schedule. The controller can further include a real time clock for running the schedule.

The controller can further include a battery power supply to hold the settings in the real-time clock.

The controller can include a plurality of terminals for a plurality of zones, such as four terminals and four zones.

The remote digital device can be selected from at least one of a smart phone, a tablet and a laptop computer. The remote digital device can include an App downloaded onto the remote digital device for determining the schedule for operation of the landscape lights.

The operation can include changing colors of each of the landscape lights.

Each of the landscape lights can include a wireless receiver for receiving color changing instructions from the remote digital device for scheduling changes in the colors of each of the landscape lights. Each of the landscape lights can include light emitting diodes (LEDs).

A communication system for controlling landscape lights, can include a transformer in combination with a controller hardwired to a power supply, the transformer combined with the controller having a wireless receiver for receiving a schedule transmitted from a remote digital device, and a plurality of landscape lights mounted at different locations being powered through the combined transformer and controller, wherein the transformer combined with the controller is useful for controlling operation of each of the landscape lights.

The plurality of landscape lights can include a plurality of zones.

The combined transformer and controller can control activating and deactivating individual landscape lights and individual zones.

Further objects and advantages of this invention will be apparent from the following detailed description of the presently preferred embodiments which are illustrated schematically in the accompanying drawings.

BRIEF DESCRIPTION OF THE FIGURES

The drawing figures depict different implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1 Landscape lighting system for scheduling lights
4 power source
8 transformer
10 zone 1 landscape lights
12 landscape light
14 landscape light
16 landscape light
20 zone 2 landscape lights
22 landscape light
24 landscape light
26 landscape light
30 zone 3 landscape lights
32 landscape light
34 landscape light
36 landscape light
40 zone 4 landscape lights
42 landscape light
44 landscape light
46 landscape light
50 remote digital device (smart phone, tablet computer, laptop computer . . . )
100 smart controller/communication device
110 antenna
115 wireless receiver
120 micro controller unit
105 per illustration in FIG. 3 power supply
140 realtime clock
150 battery
160 terminal one
170 terminal two
180 terminal three
190 terminal four
200 Second embodiment lighting system for changing colors of lights 210 zone 1 landscape lights
212 landscape light
214 landscape light
216 landscape light
220 zone 2 landscape lights
222 landscape light
224 landscape light
226 landscape light
240 zone 4 landscape lights
242 landscape light
244 landscape light
246 landscape light
300 landscape light with wireless receiver for changing light colors
305/105 power supply
310 antenna
315 receiver
320 micro controller
330 color controller
340 Light, i.e. LED (light emitting diode).

Figure 1:
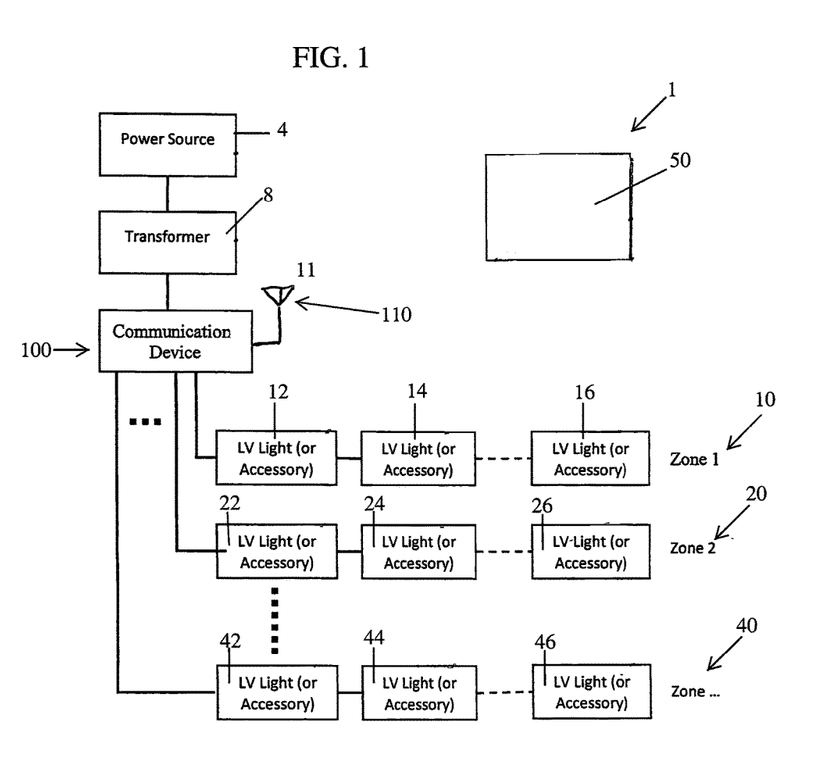
FIG. 1 is an overview of the landscape lighting system with communication device having a schedule loaded from a portable digital device.
Figure 2:
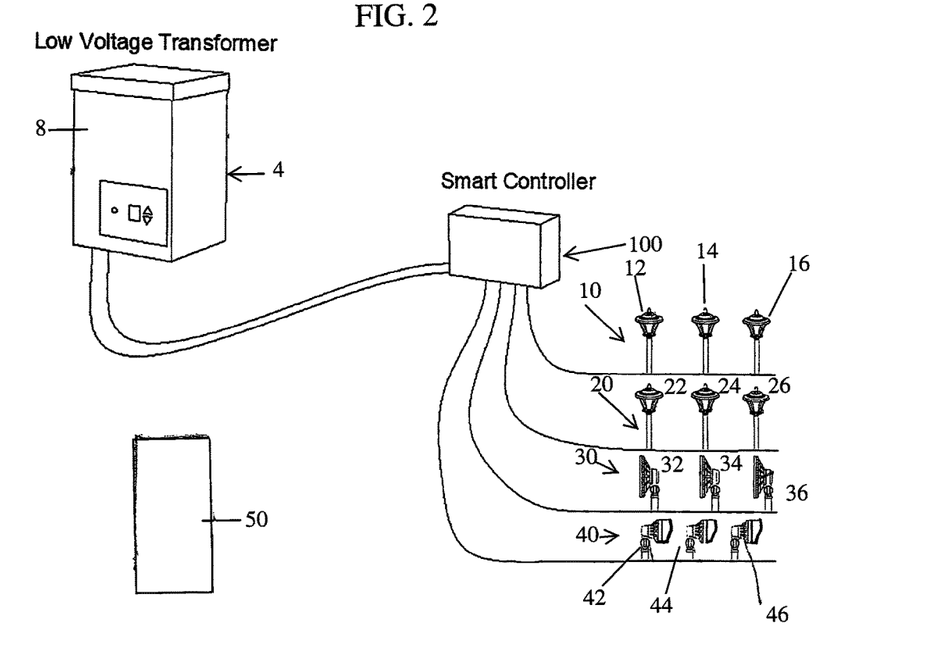
FIG. 2 is another overview of the landscape lighting system of FIG. 1 with transformer hardwired to a communication device which is wired to different zones of landscape lights.

FIG. 1 is an overview of the landscape lighting system 1 with communication device (smart controller) 100 having a schedule loaded from a portable digital device 50. FIG. 2 is another overview of the landscape lighting system 1 of FIG. 1 with transformer 8 hardwired to a communication device (smart controller) which is wired to different zones 10, 20, 30, 40 of landscape lights 12-46. FIG. 3 is a circuit diagram that can be used in the communication device 100 in FIGS. 1 and 2.

Figure 3:
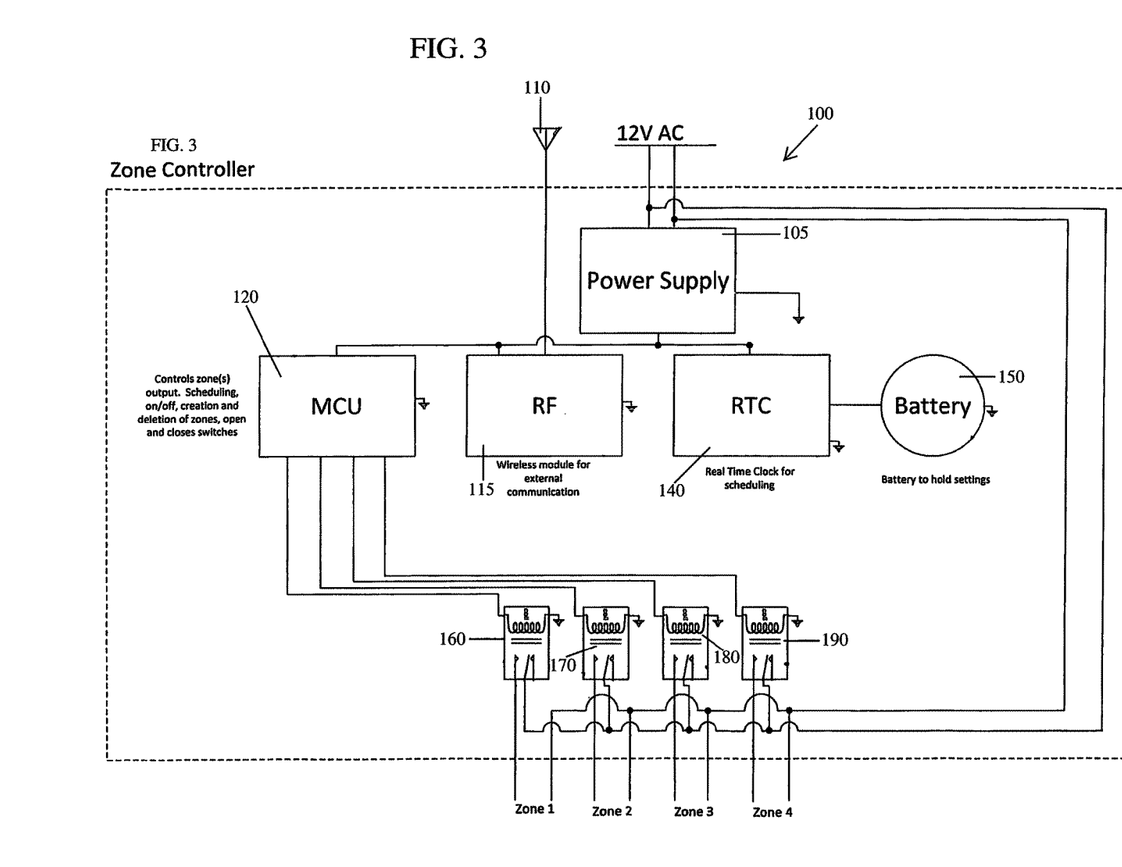
FIG. 3 is a block diagram of the circuit used in the communication device in FIGS. 1 and 2.

Referring to FIGS. 1-3, the landscape lighting system 1 can receive power such as 120 volt power from a power source in a commercial building or residential building and the like. A low voltage transformer 8 can provide 12 volts by wire connection to the smart controller (communication device 100, which provides power by being hardwired to zones 10, 20, 30, and 40. Each zone having at least one, and preferably more than one landscape light(s) in series in each zone.

For this embodiment, the power source, transformer and a string of landscape lights in series can use low voltage landscape/pathway lights shown and described in U.S. Pat. No. 8,602,585 to Lowe et al. and U.S. Pat. No. 9,668,053 to Rivera et al., each of which is assigned to the same assignee as the subject patent application, and each of which are incorporated by reference in their entirety.

The novel communication device (smart controller) 100 is preferably hardwired between the transformer and each of the zones 10, 20, 30, 40 of landscape lights 12-46. The communication device 100 can include a MCU (micro controller) 120 that can have a schedule of landscape light zones 10, 20, 30, 40 and landscape lights 12-46 programmed into the MCU 120 by a remote digital device 50 through receiving antenna 110 through an RF wireless module 115 for external communication.

The smart controller (communicator) 100 can be powered by 12 volt AC from transformer 8, and a power supply circuit 105 can provide power to the MCU 120, RF module 115 and RTC (real time clock) 140. The RTC 140 can be a real time clock for scheduling the times of the lights 12-46 and zones 10-40. A battery 150, such as a 12 volt battery and the like, can be used to hold and maintain the settings in the RTC 140. The battery 150 can run the real time clock during power failures, and can have a long battery lifespan up to for example, three or more years.

In a preferred embodiment the smart controller (communicator device) 100 can have four terminals 160, 170, 180, 190 each for controller respective zones 10, 20, 30, 40 of landscape lights. A zone can have at least one landscape light, and a zone can have a plurality of landscape lights. For example, zone 1 (10) can have a plurality of landscape lights 12, 14, 16. Zone 2 (20) can have a plurality of landscape lights 22, 24, 26. Zone 3 (30) can have a plurality of landscape lights 32, 34, 36. Zone 4 (40) can have a plurality of landscape lights 42, 44, 46. Although each zone is shown and described as having four lights, each zone can have less than or more than four lights.

The portable digital device 50 that can be used to send a schedule by wireless transmission to the smart controller (communication device) 100 can be selected from at least one of a smart phone, a tablet computer and a laptop computer, and the like. The wireless transmission can be through Bluetooth, WIFI, Zigbee, RF (radio frequency) and the like.

Referring to FIG. 3, the antenna 110 can also be used to transmit data through a wireless medium (such as but not limited to Bluetooth, and the like) to the portable digital device 50. The data can include but is not limited to data described below, such as but not limited to wattage information, power saving modes, and the like.

While the embodiment in FIGS. 1-3 show the transformer 8 hardwired to the communication device (smart controller), a transformer can be combined with the communication device (smart controller) as a single combined unit.

Figure 4:
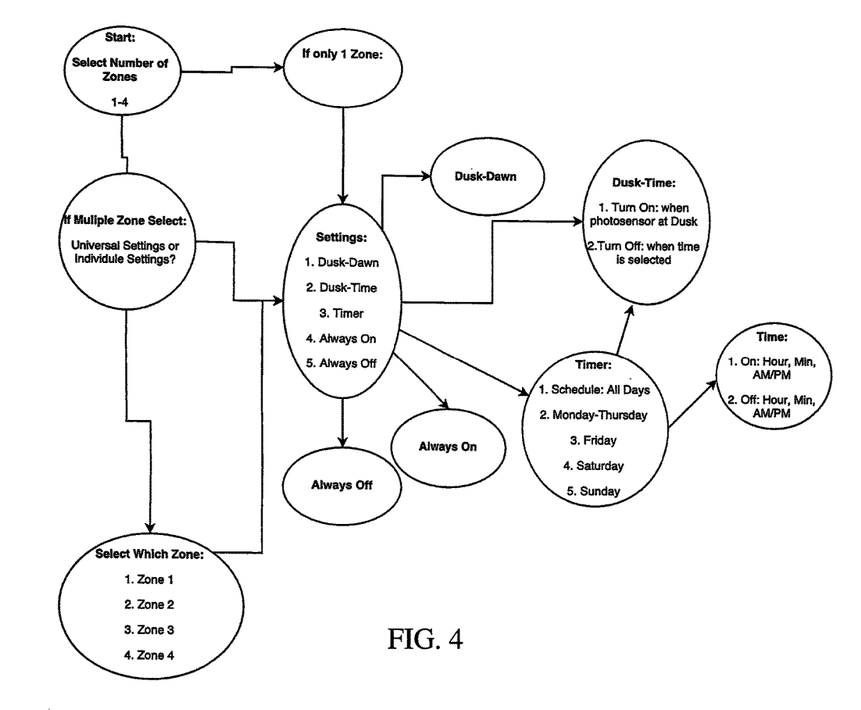
FIG. 4 is a flowchart of steps for setting up a schedule for the landscape lights.

FIG. 4 is a flowchart of steps for setting up a schedule to be programmed into the MCU 120 of the smart controller (communication device) 100 for the landscape lights 12-46.

The portable digital device 50 can have an App downloaded thereon from a website.

FIGS. 5A, 5B, 5C and 5D are screen shots of pages from the portable digital device in FIGS. 1-3 running through the steps of setting up a schedule for the landscape lights and zones of FIGS. 1 and 2.

Figure 5A:
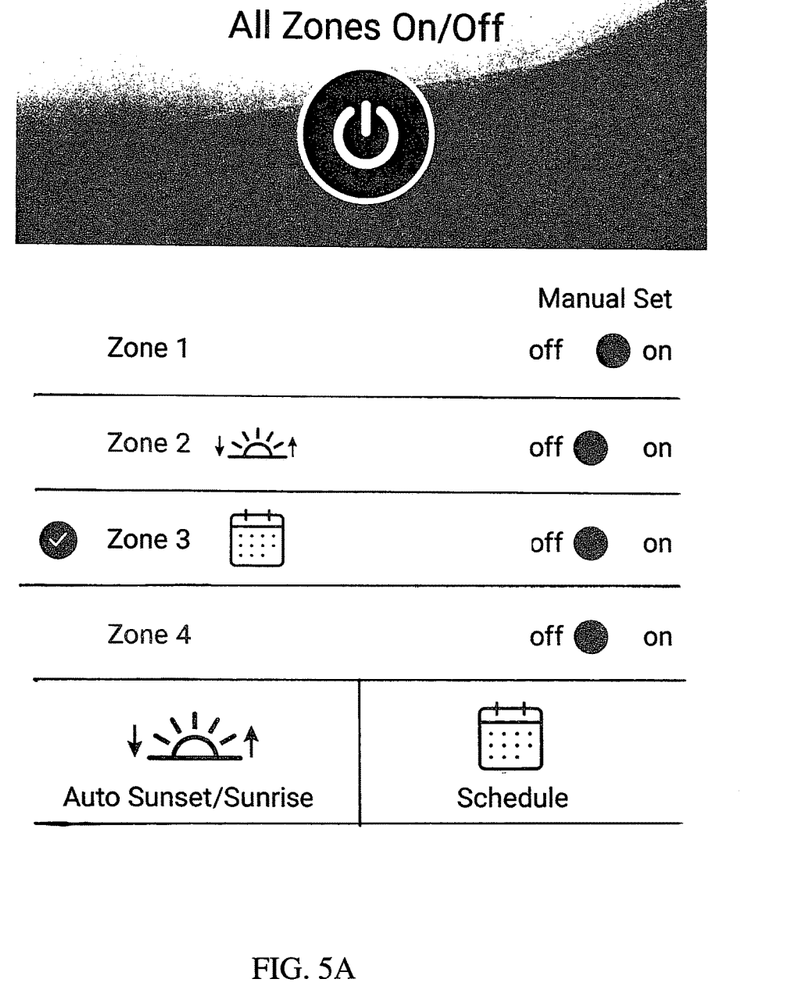
FIGS. 5A, 5B, 5C and 5D are screen shots of pages from the portable digital device in FIGS. 1-3 running through the steps of setting up a schedule for the landscape lights and zones of FIGS. 1 and 2.

FIG. 5A shows a main page that shows the following:
1. Put zones into manual on/off
2. Turn all zones on/off
3. Select multiple zones
4. Add zone(s)
5. Set sunset/sunrise mode
6. Enter scheduling.

Figure 5B:
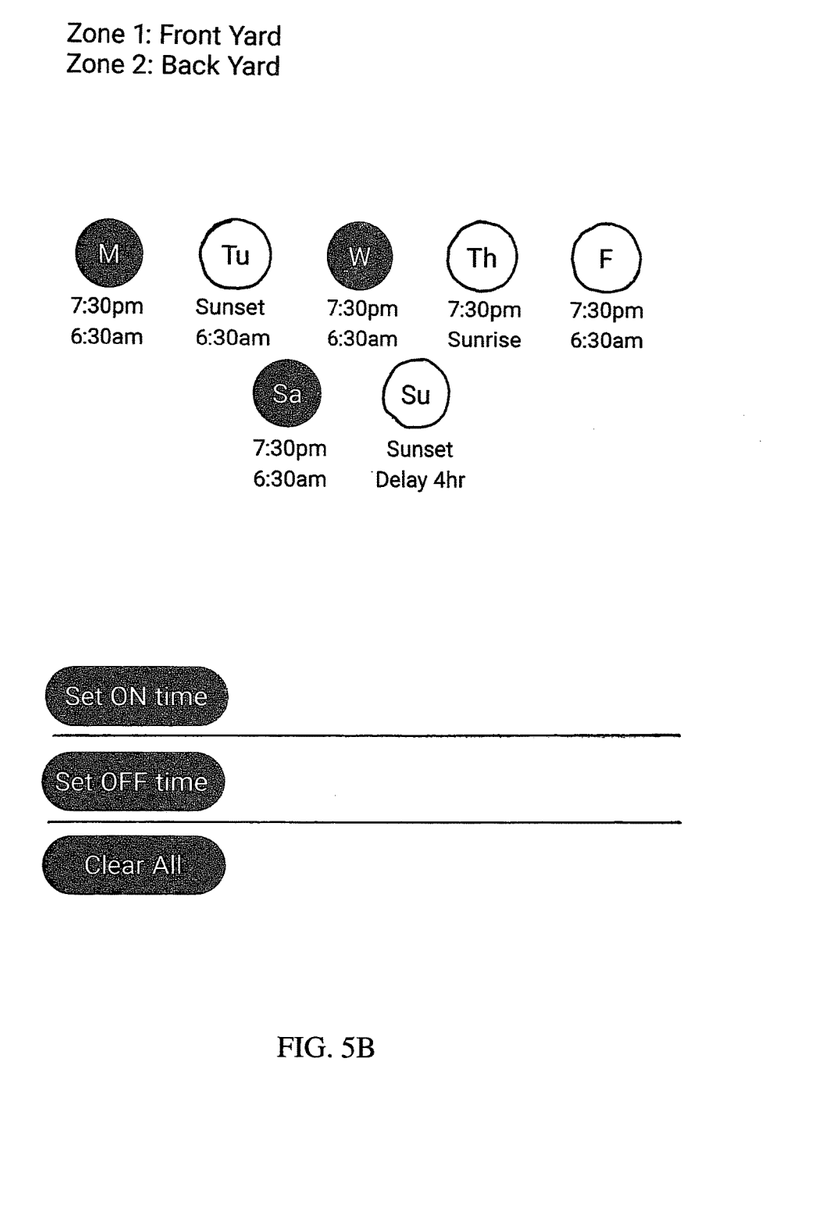

The main page in FIG. 5A can also:
1. Put zones into manual on/off
2. Select multiple zones
3. Set View if in sunset/sunrise mode
4. View if in schedule FIG. 5B shows a schedule page that includes the following:
1. Select days of the week
2. Set Auto on
3. Set Auto off
4. Set exact on time
5. Set exact off time
6. Clear schedules The schedule page can also display:
1 Select days of the week
2 Sunset sunrise time
3 Zone name and number Referring to FIGS. 5A-5B, icons (having sunrise/sunset design and schedule design) and all other features can be push button or slide button activated. Check symbol designs can be push button activated for activating each of the zones.

Figure 5C:
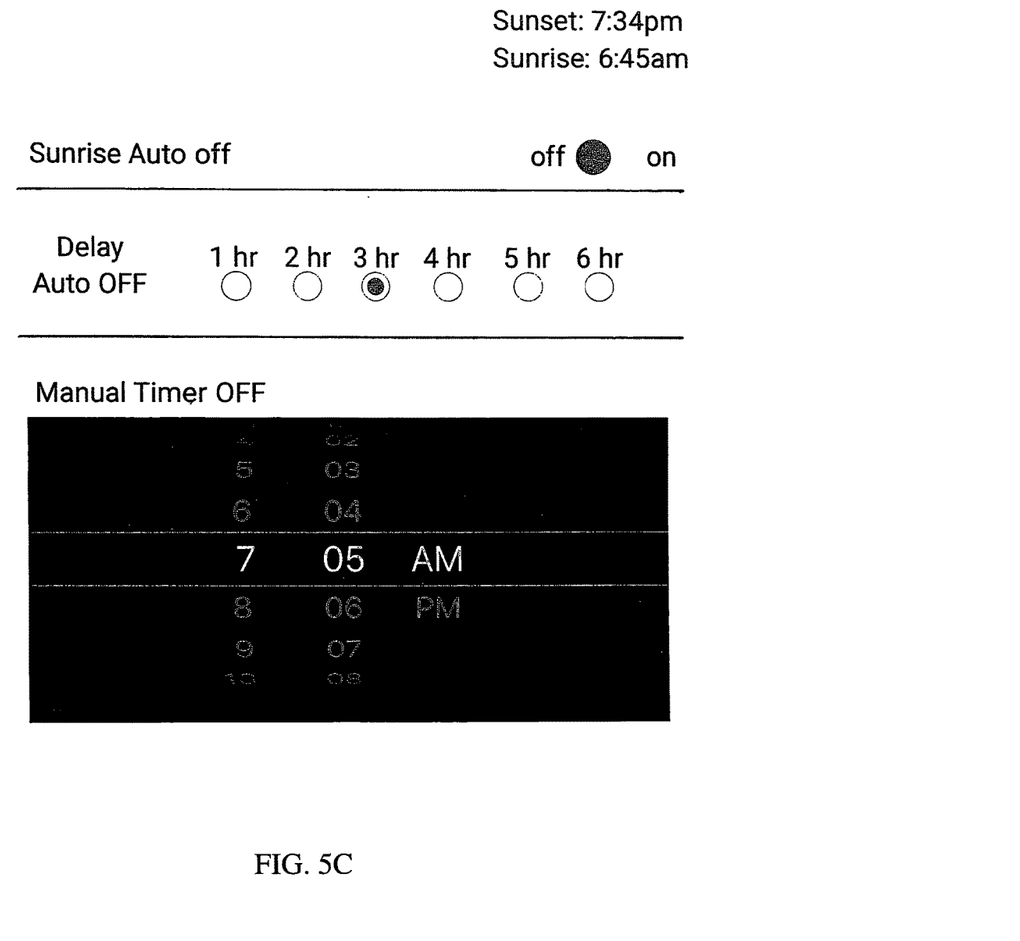

FIG. 5C shows a screen shot of a setting for the Sunrise Auto off. An On/off time display can be selected (showing Sunset at 7:34 pm and Sunrise 6:45 am). The Auto slider can be set to OFF. The time picker screen can be slid to a selected time (showing for example 7 05 am).

Figure 5D:
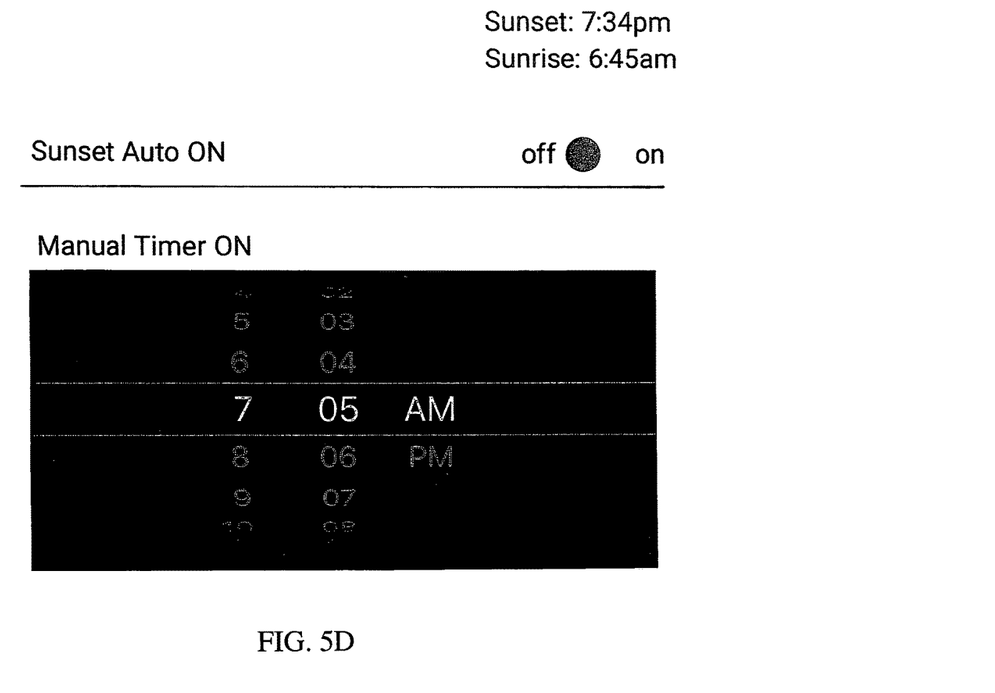

Referring to the schedule page, the user can:
1. Set Auto off (sunrise)
2. Set hrs off (select hrs 1, 2, 3, 4, 5, 6)
3. Set exact off time
4. Clear schedules FIG. 5D shows a screen shot for On Time.

Referring to the schedule page, the user can:
1. Set Auto on (sunset)
2. Set exact on time
3. Clear schedules The Sunset to Sunrise scheduling can be based off of zip code (universal or individual)

Figure 6:
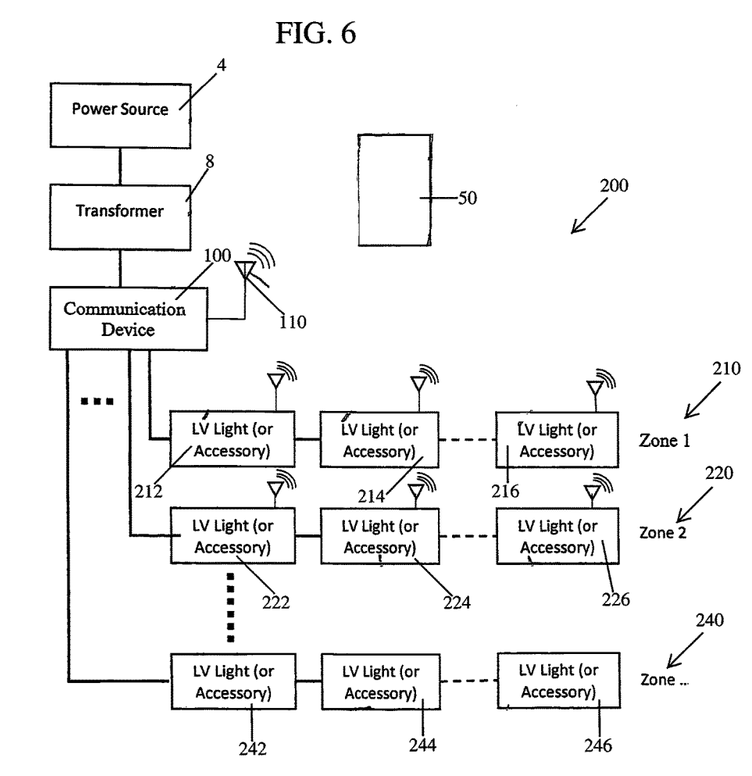
FIG. 6 is an overview of a second embodiment of the lighting system and communication device and portable digital device of FIG. 1 with each landscape light having wireless receivers that allow for the portable digital device to change colors of the landscape lights.

FIG. 6 is an overview of a second embodiment of the lighting system 200 and communication device 100 and portable digital device 50 of FIG. 1 for zone 1 (210), zone 2 (220) and zone ## (240). Each landscape lights 212, 214, 216, 222, 224, 226, 242, 244, 246 having wireless receivers that allow for the portable digital device 50 to change colors of each landscape light(s) 212-246.

Figure 7:
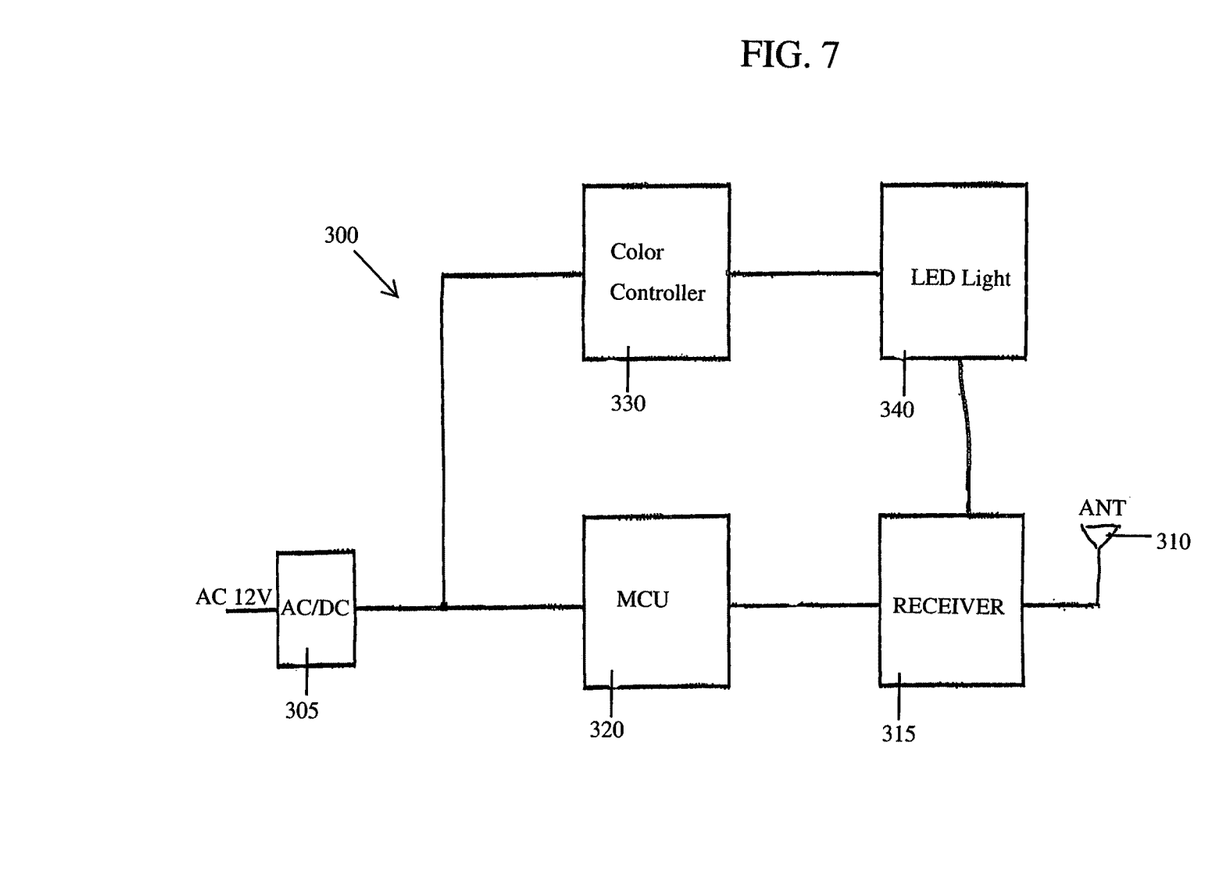
FIG. 7 is a block diagram of the circuit of a landscape light with a wireless receiver and color changeable LED lights used in FIG. 6.

FIG. 7 is a circuit diagram 300 of an individual landscape light (212-246) with a wireless receiver 310 and color changeable LED light 340) used in FIG. 6.

Referring to FIGS. 1-3 and 6-7, the system 200 can operate similar to the previous embodiment with power supply 305(105) with the addition of having landscape lights 212-246 each with antennas 310 and micro controller unit 320 with color controller 330 which control and are able to change the colors of individual lights 340, such as LED (light emitting diodes) 360 and the like.

The individual landscape lights can include an antenna and MCU such as those shown and described in U.S. Pat. No. 9,668,053 to Rivera et al, which is assigned to the same assignee as the subject patent application and incorporated by reference in its' entirety. Color changing LEDs (light emitting diodes) 340 and color controller 330 can include those shown and described in U.S. Pat. No. 6,782,309 to Laflamme et al, which is incorporated by reference, as well as those shown and described in U.S. Patent Application Publications 2005/0253533 to Lys et al. and 2015/0102731 to Altamura et al. which are both incorporated by reference in their entirety.

Similar to the smart controller/communication device 100, the antenna 310 can also be used to transmit data through a wireless medium (such as but not limited to Bluetooth, and the like) to either or both the portable digital device 50 and the smart controller/communication device. The data can include but is not limited to data described below, such as but not limited to wattage information, power saving modes, and the like.

The portable digital device 50 can have an App downloaded from a website that allows for controlling colors or each landscape light, and/or for controlling colors of each zone, as selected.

Similar to the previous embodiment, power can be supplied through transformer 8 which is wired to the smart controller (communication device) 110 and through each terminal 160, 170, 180, 190, that are each wire connected in series to respective string of lights 212-216, 222, 226, 242-246.

The power passing into each zone 210, 220, 230 can be supplied by the transformer power 8 that is hardwired to the power input 305 and MCU 320 and color controller 330 of LED Light 340 of each landscape light 212-246.

A preferred embodiment can communicate with the antenna 310 on each light through wireless frequency communications from the portable digital device 50. Alternatively, communication can run through the power lines as modulated data using a power-line communication protocol.

Data that can be communicated between each landscape light can include but not be limited to Real Time Wattage Usage.

Real Time Wattage Usage can be described when the installer can visually understand an estimated energy consumption of each zone. This is important to know since the zones cannot exceed 100 w each zone. It also can send feedback if after the system is configured, and the wattage consumption changes, it would be an indication that a device may not be on when it is supposed to be.

a. Detection of current wattage usage from items on a low voltage cable
b. Sending or receiving of this real-time wattage data to designate a sub task
Sub Task can include but not limited to
Real time wattage to be transferred back to master communications device, such as a smart phone.
i. SMS (or notification depicting usage
ii. A light or screen revealing usage is under or exceeding a certain wattage.
iii. "Smart sense" where the wattage is monitored to determine an average wattage consumption. If the wattage drops below the average established, the owner is notified to check the system. A light or lights can have gone out.

The invention can use photo cell function Photo Cell Function where a photo cell triggers an event based on the current generated by the energy picked up from light coming into the photo cell. If the current generated falls below a programmed value, the system is triggered. If the current goes above the programmed value, the system is triggered.

The invention can be customized to use for designated zones

User based feedback that can be utilized to control settings in the device.

User feedback can enable the sub action to take place. Examples of sub actions can include but not limited to, something being turned on or off, dimmed, color changed User feedback can include:
a. Hand waving (Motion Activation)—using passive infrared sensor or PIR the system can pick up movement to trigger a function
b. Touch activation—Using sensors, such as a capacitive sensor, the system can trigger a function.
c. Audible interaction (Voice launching based on specific commands)

Weather based settings can be incorporated into the invention.
a. Weather data can be gathered from a communications device and initiate a set of sub actions
i. Example 1: It is 5 pm and a communications device or system collects information that it is predicted to rain that evening at 7 pm. At 5 pm the lights can start repeatedly diming to notify others that rainfall is coming.
ii. Example 2: It is 5 pm and a communications device or system collects information that it is predicted to rain that evening at 7 pm. At 5 pm the lights can start repeatedly diming and get faster to notify others that rainfall is coming and is close by.
iii. Example 3: It is 5 pm and a communications device or system collects information that it is predicted to rain that evening at 7 pm. At 5 pm the lights can change color to notify others that lightning is coming.

iv. System can create noise that resembles lighting or rain fall to notify users of incoming weather conditions Holiday Based settings can be incorporated into the invention.

Based on the time or date a holiday based setting can be implemented can be gathered from a communications device and initiate a set of sub actions:

i. Example 1: It is 1 week before Halloween and a communications device or system collects information that based on a date or time certain light color themes, for this case an orange and purple light color theme should be started for a certain period of time.

ii. Example 2: It is 2 weeks before Christmas and a communications device or system collects information that based on a date or time certain light color themes, for this case a Green and Red light color theme should be started for a certain period of time.

iii. Example 3: It is 3 weeks before Christmas and a communications device or system collects information that based on a date or time certain projection such as a snow flake or other Christmas themed lenses can be initiated and projected on a home.

iv. Example 4: It is 2 days before St. Patrick's day and a communications device or system collects information that based on a date or time certain projection such as a 4 leaf clover or other Saint Patrick themed lenses can be initiated and projected on a home.

The system can play holiday music provided by user that is stored on device, such as but not limited to:

1. Halloween music
2. Christmas music
3. User Created Content

Power saving based settings can be incorporated into the invention:

A system that can detect a power saving mode that alter performance based on savings desired. An example would be a "power saving mode" that can be a setting on a smartphone and once set would send a signal to a listening device and initiate power saving activity to select devices.

Energy Conservation mode where the user gives the system a set amount of power it can consume and require it to turn off after that power requirement has been met Power Outage setting to turn on/off:

Communication enabling device to turn on/off Diming, which can be Fully Customizable with Low/Medium/High settings.

The invention can enable customization of zones for different portions of a yard. A Set timer or let dawn to dusk program can adjust it automatically based on Geolocation of an object, such as a wireless device, mobile phone, or internet connected device.

The invention can incorporate a feature that enables a projector to display different color patterns or images via feedback from a connections device Security settings based on feedback, such as:

a. Example 1: would be if a button is pressed inside and designated lights can turn on to ward off potential risks.

b. Example 2: Would be if a sensor or other alarm is triggered than different colored lights can be lite in certain areas of a home.

Multiple motion sensors go off and a spotlight turns on.

Multiple motion sensors go off and a red light turns on.

Security settings based on motion can be incorporated where for example, a person walking or moving in a yard, pathway, driveway, or area within range of the motion sensor:

a. Motion sensors to turn on designated lights.

b. User based setting that enables the playing of audio or tone

Setting to control other communications devices such as a sprinkler system, ceiling fan, television, pool lights, and the like.

The invention can include a method incorporating wireless or in-line landscape lighting accessories to landscape lighting systems. Accessories such as motion detectors, security cameras, and photo sensors can activate landscape lighting systems by sending a wired or wireless signal to the power source of the landscape lighting system.

The accessories can operate on a rechargeable battery when the landscape lighting system was powered off. When the landscape lighting system is powered, the battery would recharge using the current provided by the landscape lighting power source.

The advantage of the wireless connectivity would allow the landscape lighting system to be turned off in a hibernation mode while waiting for the accessory to signal the landscape lighting power source to turn on.

In prior art, the user must run the powered cable to the accessory first and then the accessory would act as a switch to power all lighting down the line. This is undesirable for the customer because the landscape lighting power source would need to be powered on at all times consuming energy and affecting the lifetime use of the power source. Also, the operator would have to cut the landscape lighting cable at the prior art accessory and then make two wiring connections in order for the switch to operate correctly. In the current innovation, the accessory can be placed in any location along the powered cable that is in radio frequency range of the landscape lighting power source.

Although the invention is described for use with landscape lights, the invention can be used with other accessories. Accessories can include but are not limited to:

a. Low Voltage Lights
b. Color Changing Lights
c. Speaker Systems
d. Weather Based Sensor
e. Hub
f. Ceiling fans
g. Pool lights
h. Remote control
i. Solar lights
j. Solar system
k. Sprinkler system
l. Smartphone
m. Smart device
n. Security PIR Sensors
o. Security system
p. IOT (internet of things) device, such as a remote device connected to internet through a hub or router.
q. Pond/fountain Pumps While the embodiments refer to four zones, the invention can work with as few as two zones, as well as more than four zones, such as but not limited to up to eight zones, and more.

Although FIG. 6 shows a wireless communication, the system can alternatively use power line communications protocol where data is modulated with the power supply connection lines.

While a portable digital device 50 is shown and described, the invention can include a desktop computer, and the like to provide the wireless transmission to the smart controller (communication device) 100.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A communication system for controlling landscape lights, comprising:
   a transformer connected to a power source;
   a plurality of landscape lights mounted at different locations being powered through the transformer; and
   a computer controller wired between the transformer and the plurality of landscape lights, the controller for providing power to and for controlling operation of each of the landscape lights, the computer controller having a wireless receiver for receiving a schedule transmitted from a remote digital device, wherein the plurality of landscape lights includes a plurality of separate zones of landscape lights, each zone having at least one landscape light, and all of the zones are hardwired in series with the power source, and each zone is separately hardwired in parallel with the computer controller.

2. The communication system of claim 1, wherein the power source includes 120 volt power supply, and the transformer converts the 120 volt power supply to a 12 volt power.

3. The communication system of claim 1, wherein the schedule provides times for turning on and off the landscape lights.

4. The communication system of claim 1, wherein the schedule provides times for turning on and off the landscape lights.

5. The communication system of claim 4, wherein the schedule further provides scheduling times for adding a new zone having at least one landscape light to the plurality of zones and for deleting at least one of the plurality of zones.

6. The communication system of claim 1, wherein the controller includes:
   a wireless receiver antenna.

7. The communication system of claim 6, wherein the controller further includes:
   a real time clock for running the schedule.

8. The communication system of claim 7, wherein the controller further includes:
   a battery power supply to hold the settings in the real-time clock.

9. The communication system of claim 1, wherein the controller includes; a plurality of terminals for a plurality of zones.

10. The communication system of claim 9, wherein the plurality of terminals includes four terminals and the plurality of zones includes four zones.

11. The communication system of claim 1, wherein the remote digital device is selected from at least one of a smart phone, a tablet and a laptop computer.

12. The communication system of claim 11, wherein the remote digital device includes:
   an App downloaded onto the remote digital device for determining the schedule for operation of the landscape lights.

13. The communication system of claim 1, wherein the operation includes
   changing colors of each of the landscape lights.

14. The communication system of claim 13, wherein each of the landscape lights includes:
   a wireless receiver for receiving color changing instructions from the remote digital device for scheduling changes in the colors of each of the landscape lights.

15. The communication system of claim 14, wherein each of the landscape lights includes: light emitting diodes (LEDs).

16. A communication system for controlling landscape lights, comprising:
   a transformer in combination with a computer controller hardwired to a power supply, the transformer combined with the computer controller having a wireless receiver for receiving a schedule transmitted from a remote digital device; and
   a plurality of landscape lights mounted at different locations being powered through the combined transformer and controller, wherein the transformer combined with the controller is useful for controlling operation of each of the landscape lights, the plurality of landscape lights includes a plurality of zones, each zone having at least one landscape light, the combined transformer and controller controls activating and deactivating individual landscape lights and individual zones, and all of the zones are hardwired in series with the power source, and each zone is separately hardwired in parallel with the computer controller.

* * * * *